United States Patent [19]

Nishikawa et al.

[11] Patent Number: 6,031,582
[45] Date of Patent: Feb. 29, 2000

[54] SYSTEM AND METHOD FOR ESTIMATING MOTION VECTOR IN MACRO BLOCK

[75] Inventors: Tsuyoshi Nishikawa, Kawasaki, Japan; Yoshiro Tsuboi, Sunnyvale, Calif.; Masafumi Takahashi, Yokohama, Japan

[73] Assignee: Kabushiki Kaisha Toshiba, Kawasaki, Japan

[21] Appl. No.: 08/993,747

[22] Filed: Dec. 19, 1997

[30]     Foreign Application Priority Data

Dec. 20, 1996 [JP] Japan .................................. 8-341928

[51] Int. Cl.⁷ .............................. H04N 7/30; H04N 7/32
[52] U.S. Cl. ........................................... 348/699; 348/416
[58] Field of Search .................................. 348/402, 407, 348/413, 416, 699; 386/111; 382/236

[56]                References Cited

U.S. PATENT DOCUMENTS

| 5,428,403 | 6/1995  | Andrew et al. ........................... | 348/699 |
| 5,652,625 | 7/1997  | Chen et al. .............................. | 348/416 |
| 5,719,642 | 2/1998  | Lee .......................................... | 348/699 |
| 5,742,710 | 4/1998  | Hsu et al. ................................ | 382/236 |
| 5,822,007 | 10/1998 | Knee et al. .............................. | 348/416 |
| 5,936,672 | 8/1999  | Ahnn ....................................... | 348/416 |

FOREIGN PATENT DOCUMENTS 404180383A  6/1992  Japan ................................ H04N 7/32

OTHER PUBLICATIONS

Yany, Kun–Min, Ming–Ting Sun, Lancelot Wu, "A Family of VLSI Designs for the Motion Compensation Block–Matching Algorithm," *IEEE Transactions on Circuits and Systems*. vol. 36, No. 10, Oct. 1989. pp. 1317–1325.

Yang et al, "VLSI Architecture for HDTV Motion Estimation Based on Block–Matching Algorithm", Proceeding of the 7th International Conference on VLSI Design, IEEE, 1994, pp. 287–290.

*Primary Examiner*—Vu Le
*Attorney, Agent, or Firm*—Loeb & Loeb, LLP

[57]                ABSTRACT

A motion vector estimating system prepares a predetermined range of a frame/field of image data as a macro block, selects a plurality of proposed motion vectors in the reference region, calculates a signal-strength difference between pixels corresponding to each of the proposed motion vectors of current and reference images. The system comprises: an accumulating element for deriving an accumulation result in parallel on the basis of the signal-strength difference by means of accumulating circuits connected in parallel as a pipeline; an accumulation stopping element having separate stop circuits for separately stopping the accumulation of the accumulating element every n accumulating circuits; and a control element for controlling the supply of the current image data and the reference image data for proposed motion vectors for each of the accumulating circuits, and for outputting a separate stop signal to the accumulation stopping element for stopping the accumulation for the proposed motion vector of the accumulating circuits immediately after the accumulated value of the absolute values of the differences between the signal values of picture elements of the current image and the reference image exceeds a predetermined value. Thus, it is possible to suitably omit unnecessary accumulation in a pipeline processing for estimating a motion vector, so that it is possible to increase the processing speed and to decrease the electric power consumption.

10 Claims, 15 Drawing Sheets

SYSTEM AND METHOD FOR ESTIMATING MOTION VECTOR IN MACRO BLOCK

BACKGROUND OF THE INVENTION

The present invention relates generally to a motion vector estimating system and method for estimating a motion vector of a macro block, which is a predetermined range of a frame/field of a dynamic image. More specifically, the invention relates to a motion vector estimating system and method for accumulating signal-strength differences between all picture elements of current and reference images with respect to proposed motion vectors in the macro block, to select the minimum accumulation result as a motion vector.

In the field of dynamic image processing, there has been proposed a technique for estimating a motion vector in a macro block by comparing signal strengths of corresponding picture elements in specific ranges of current and reference images for each of proposed motion vectors, accumulating values representative of signal-strength differences between all picture elements in the macro block with respect to each of the proposed motion vectors, sequentially comparing the accumulation results obtained for each of the proposed motion vectors, and selecting a proposed motion vector having the minimum accumulation result as a motion vector to be estimated. The reference image means an image corresponding to a macro block obtained by the translating of the macro block of the current image by a motion vector.

In the technique described above, there has been proposed a motion vector estimating circuit for sequentially arranging accumulator circuits in parallel in order to carry out the accumulation processing at a high speed using a small amount of data, and for assigning the operation for a proposed motion vector to each of the accumulator circuits to output the accumulation result data as a pipeline. In this motion vector estimating circuit, each of the accumulator circuits carries out the operation of the signal-strength difference using the luminance-value difference of the current and reference image data. Specifically, each of the accumulator circuits carries out the operation of an absolute value of "a luminance value of a picture element of a current image minus a luminance value of a picture element of a reference image".

FIG. 1 is a block diagram of a conventional motion vector estimating circuit. In this drawing, accumulating means 1 comprises first and second through n-th differential absolute-value accumulating circuits 2a and 2b through 2n, which are connected in parallel to each other as a pipeline, (n-1) pipeline registers 3a, 3b through 3(n-1) and 3(n-1), each of which is provided between the adjacent differential absolute-value accumulating circuits. In addition to the accumulating means 1, this motion vector estimating circuit further comprises a minimum-value information management circuit 4 for receiving the output of each of the differential absolute-value accumulating circuits to manage a minimum-value information, and a control circuit 5 for outputting a current image data D1 and a reference image data D2 with respect to the next motion vector on the basis of the output of the minimum-value information management circuit 4.

With this construction, the operation of the conventional motion vector estimating circuit will be described. In order to estimate a motion vector, it is required to carry out the accumulation sequence at least once with respect to each of proposed motion vectors in a predetermined range to estimate the accumulated value. Therefore, first, the control circuit 5 supplies an appropriate current image data D1 and a reference image data D2 to the respective accumulator circuits 2a through 2n forming the accumulating means 1. The current image data D1 are sequentially transferred to the pipeline registers 3a through 3(n-1). The accumulator circuits 2a through 2n calculate the absolute values of the differences between the transferred current image data D1 and the reference image data D2 supplied from the control circuit 5 as values of signal-strength differences, to accumulate the values of the signal-strength differences.

When the accumulation is completed with respect to all of the corresponding motion vectors, the accumulator circuits 2a through 2n output an accumulated value signal S1. After the minimum-value information management circuit 4 is initialized by the accumulated value signal S1 corresponding to a first proposed motion vector, the minimum-value information management circuit 4 compares the accumulated value signal S1 with the minimum value retained therein. If the accumulated value signal S1 is smaller than the value retained in the minimum-value information management circuit 4, the accumulated value S1 is updated as a newly retained value. Every time the retained value of the minimum-value information management circuit 4 is updated, a comparison result signal S2 is outputted to the control circuit 5. The respective accumulator circuits 2a through 2n are initialized before the operation of a newly proposed motion vector is started.

When the review of all of the proposed motion vectors is completed, the estimation of the motion vector is completed. Therefore, the conventional motion vector estimating circuit must operate to carry out the accumulations of the number of cycles per an arranged group of motion vector candidates, which can scan all of the regions in a macro block or a thinned-out macro block until the minimum value is sequentially estimated, and the conventional motion vector estimating circuit must always operate to carry out the accumulations of a fixed number of cycles regardless of the quality of an input image.

Referring to FIG. 2, the explanation of the operation of the conventional motion vector estimating system will be supplemented. In a case where the motion vector estimation is carried out by the pipeline architecture described above, the estimated values are accumulated with respect to the regions corresponding to the respective motion vectors, and the same estimation is carried out with respect to all of proposed motion vectors, so that a proposed motion vector for providing the minimum (or maximum) estimated value is selected therefrom as a motion vector. If the number of proposed motion vectors, which can be estimated at a time, is defined as a parallel number, the motion vector estimation is completed by repeating the accumulation the number of times obtained by dividing the number of all of the proposed motion vectors by the parallel number. Therefore, when the processing is carried out by parallel number m, this processing is repeated until no proposal remains after every m proposals are selected from the proposed motion vectors. For example, if the total number of motion vectors is 1024 and the parallel number is 16, the motion vector estimation is completed by repeating the accumulation 64 times.

In FIG. 2, a first estimation of accumulated values for proposed motion vectors 1 through m is first carried out, and then, second through n-th estimations thereof are sequentially carried out. Unless all of first through n-th estimations are carried out, the motion vector estimation are not completed.

As described above, the conventional motion vector estimating circuit must carry out the accumulation operations of a fixed number of cycles regardless of the quality of an input image, so that the power consumption required for the motion vector estimations of a number of cycles is great.

In addition, since the accumulation operation is carried out by supplying current the image and reference image data even if the accumulation result should be useless is a problem in that useless data flow is carried out while a predetermined operation for motion vector estimation is carried out.

SUMMARY OF THE INVENTION

It is therefore an object of the present invention to eliminate the aforementioned problems and to provide a motion vector estimating circuit and a motion vector estimating method, which can change the number of cycles for accumulation to save the power consumption and which can estimate a motion vector by a small data flow, by stopping the accumulation operation for a proposed motion vector immediately after the accumulated value of the absolute value of the difference between signal values of picture elements of current and reference images exceeds a predetermined value.

In order to accomplish the aforementioned and other objects, according to one aspect of the present invention, there is provided a system for estimating a motion vector in a reference region for a macro block, which designates an image in a predetermined range of a frame/field in an image data as a macro block to select proposed motion vectors in the reference region, calculates a signal-strength difference between picture elements corresponding to the proposed motion vectors of a current image and a reference image, accumulates the signal-strength differences calculated for the picture elements in the reference region to derive an accumulation result, and selects a proposed motion vector providing an accumulation result of a maximum or minimum value from the proposed motion vectors in a specific range for the macro block as a motion vector, the system comprising: accumulating means comprising a plurality of accumulating circuits, connected as a pipeline, for inputting a current image data and a reference image data in parallel for the proposed motion vectors and for parallel-processing accumulation for a plurality of motion vectors; accumulation stopping means for separately stopping an accumulation processing operation of the accumulating means for each of the accumulating circuits; and control means for controlling the supply of the current image data and the reference image data for the proposed motion vectors for each of the accumulating circuits of the accumulating means, and for outputting a separate stop signal for stopping a separate accumulation for each of the accumulating circuits to control the stop of the accumulation processing of the accumulation circuit.

Each of the accumulating circuits of the accumulating means may have a determining circuit having a predetermined identification threshold for comparing a partway accumulated value with the identification threshold at least once to determine whether an accumulated value is valid or invalid, on the basis of the comparison result, and the stopping means may have a separate stop circuit for stopping a corresponding accumulating circuit until the accumulation operation for a newly proposed motion vector is started, when the determination result of the determining circuit is invalid.

The accumulating means may have a start circuit for disqualifying all of the proposed motion vectors currently reviewed to start the accumulation processing operation for a newly proposed motion vector, immediately after all of the accumulated values compared with the identification threshold in the parallel processing are determined to be invalid.

The stopping means may have a stop circuit for outputting a motion vector estimation terminating signal when the motion vector estimation is completed, to stop the operation of the accumulating means until a motion vector estimation request signal is inputted from the outside.

The accumulating means may determine the identification threshold on the basis of the maximum or minimum value of the accumulated values which have been reviewed.

The accumulating means may determine the identification threshold using a fixed value, which does not change during a motion vector estimating process, on the basis of a predetermined rate to a theoretically available maximum value.

Each of the accumulating circuits of the accumulating means may have a flip-flop capable of retaining a maximum number, which is equal to the identification threshold, and deal with a carry-out signal of the most significant digit of each of the accumulating circuits as a magnitude comparing signal compared with the identification threshold so as to decrease the number of digits of the flip-flop for retaining the accumulated values.

According to another aspect of the present invention, there is provided a method for estimating a motion vector for a macro block in a reference region, the method comprising the steps of: designating an image in a predetermined range of a frame/field as a macro block, and selecting a plurality of proposed motion vectors existing in the reference region; calculating, in parallel, signal-strength differences between corresponding picture elements of a current image and a reference image for a predetermined parallel number of proposed motion vectors of the plurality of proposed motion vectors for the macro block in the reference region designated, and accumulating the signal-strength differences for each of specific proposed motion vectors processed in parallel; and stopping the accumulation for the proposed motion vectors when the accumulation result of the minimum or maximum value is identified for any one of the parallel number of proposed motion vectors processed in parallel.

The step of stopping the accumulation may comprise the steps of: comparing the magnitudes of a partway accumulated value for each of the proposed motion vectors processed in parallel and a predetermined identification threshold at least once; determining whether the accumulated value for each of the proposed motion vectors is valid or invalid, on the basis of the compared result; and stopping the accumulation operation for the corresponding one of the proposed motion vectors until the accumulation for a newly proposed motion vector is started, when it is determined that the accumulated value is invalid.

After the step of stopping accumulation, the motion vector estimating method may further comprise the step of: disqualifying all of the proposed motion vectors, for each of which the accumulation is carried out by the parallel processing, and starting a parallel processing for a newly proposed motion vector, immediately after all of the accumulation results for all of the proposed motion vectors processed in parallel are stopped.

As described above, according to the motion vector estimating system and method of the present invention, it is possible to save the power consumption by stopping the accumulation using an appropriate reference.

In addition, it is possible to save the power consumption of the whole motion vector estimating system, to decrease the motion vector estimating time, and to statistically improve the motion vector estimating speed.

Moreover, since it is not required to carry out substantially unnecessary operations, it is possible to save the power consumption and the operation time. In addition, it is possible to omit useless operations and to increase the motion vector estimating speed, only by slightly changing a conventional circuit construction. In particular, in the field of dynamic image radio communication technology such as MPEG4, it is possible to provide an epoch-making technology.

DESCRIPTION OF THE PREFERRED EMBODIMENTS

Referring now to the accompanying drawings, the preferred embodiments of a motion vector estimating circuit and a motion vector estimating method, according to the present invention, will be described in detail below.

Figure 3:
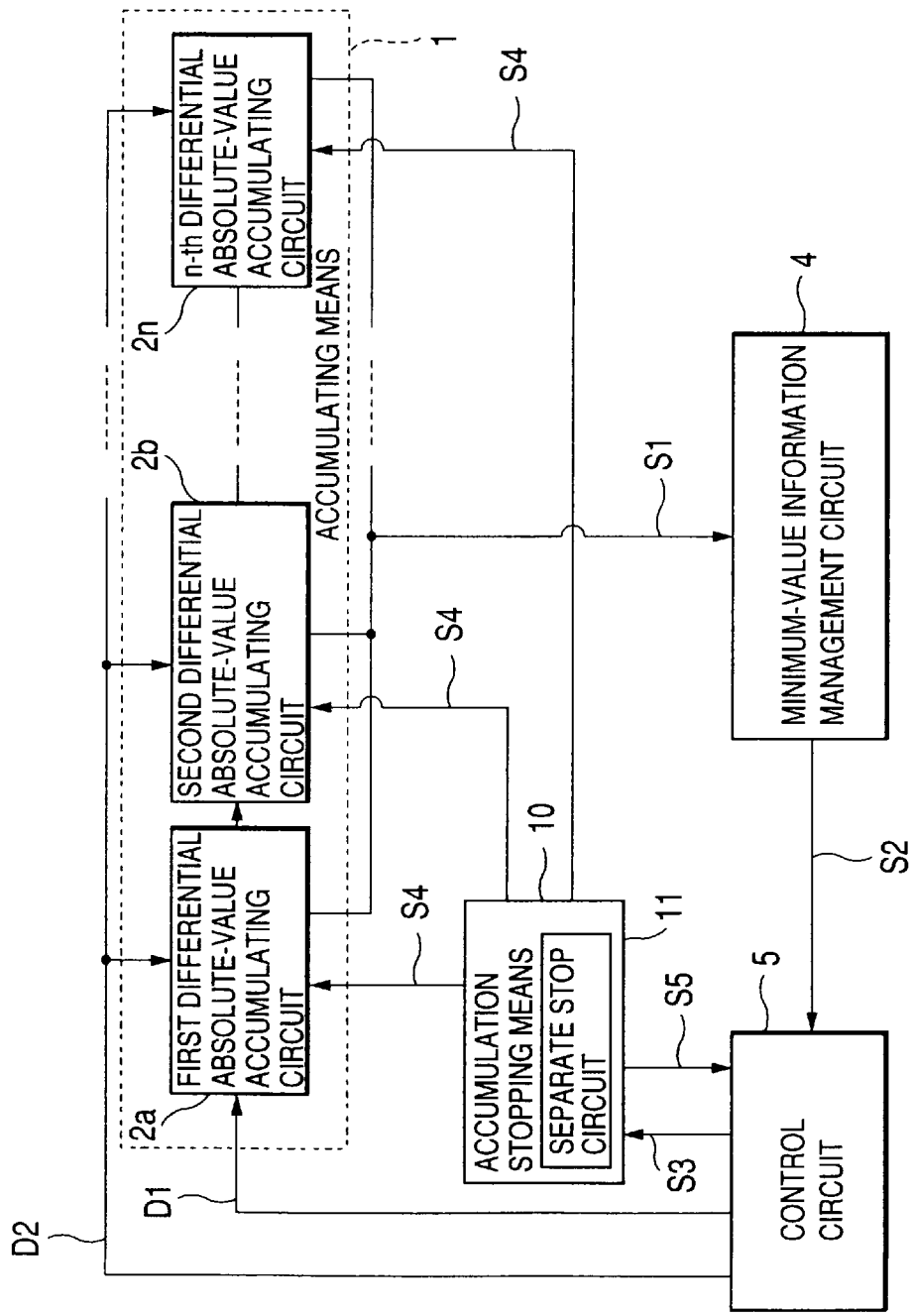
FIG. 3 is a block diagram of the first preferred embodiment of a motion vector estimating system according to the present invention.

FIG. 3 is a block diagram of the first preferred embodiment of a motion vector estimating system according to the present invention. In this first preferred embodiment, a luminance value of a picture element is used as a signal-strength difference value, which is accumulated to estimate a motion vector. Therefore, in the first preferred embodiment, signal-strength difference values, i.e., the absolute values of "the luminance values of picture elements of a current image minus the luminance values of picture elements of a reference image", are accumulated.

In FIG. 3, the motion vector estimating system comprises: accumulating means 1 for sequentially accumulating the absolute values of luminance-value differences between picture elements of a current image data D1 and a reference image data D2; first through n-th differential absolute-value accumulating circuits 2a through 2n forming the accumulating means 1; a minimum-value information management circuit 4 for inputting an accumulated signal S1 outputted from the accumulating means 1 and for comparing the accumulated signal S1 with the minimum value of the absolute values of the differences to output a comparison result signal S2; control means 5 for outputting the current image data D1 and the reference image data D2 and for outputting a stop control signal S3 for stopping the operation of one of the differential absolute-value accumulating circuits 2a through 2n forming the accumulating means 1 when the output of the one of differential absolute-values accumulating circuits 2a through 2n is invalid; and accumulation stopping means 10 for outputting a stop signal S4 for stopping the operation of the one of the first through n-th differential absolute-value accumulating circuits 2a through 2n having the invalid output on the basis of the stop control signal S3 outputted from the control means 5. The accumulation stopping means 10 has a plurality of separate stop circuits 11 for separately stopping the accumulation processing for each of the first through n-th differential absolute-value accumulating circuits 2a through 2n.

Figure 1:
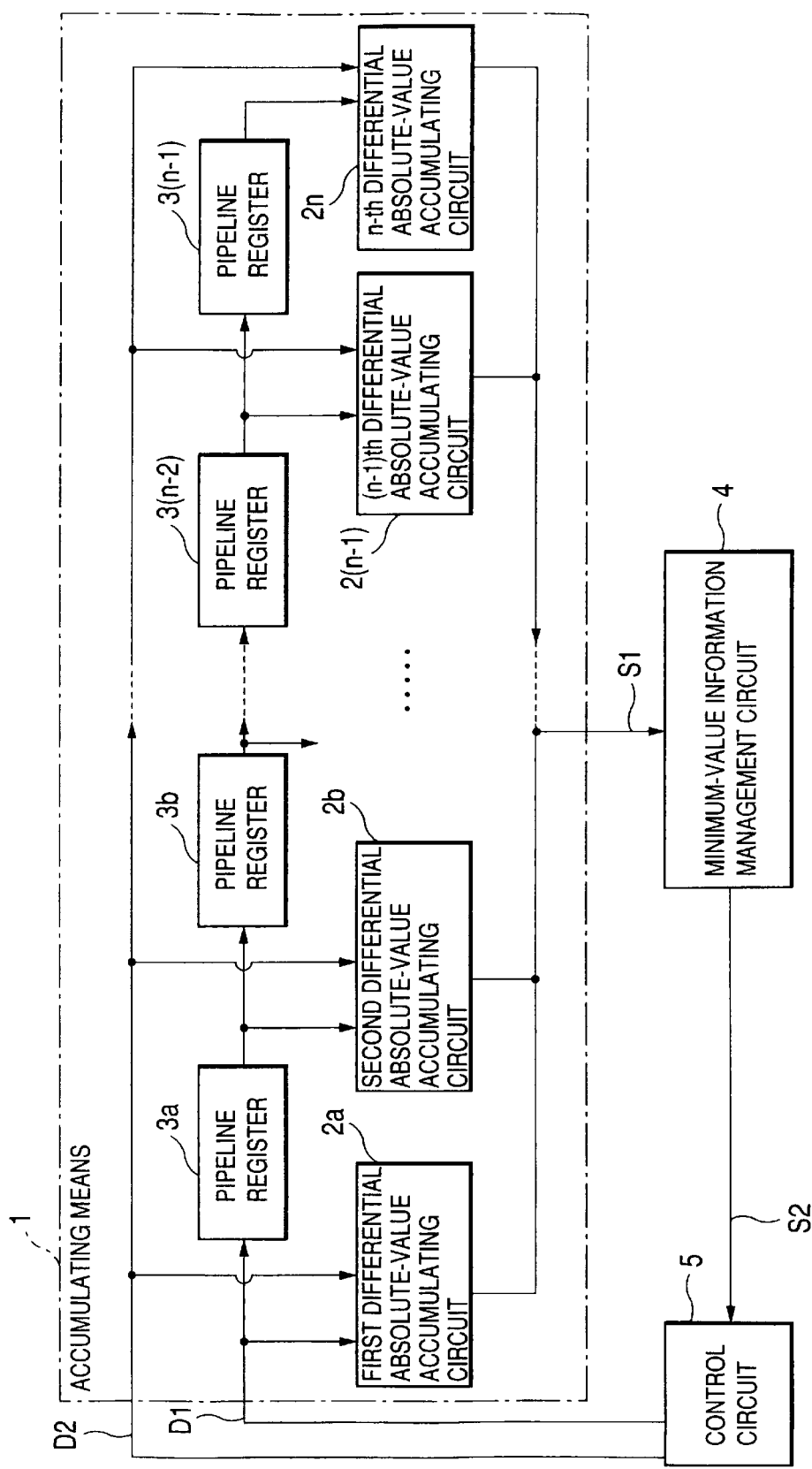
FIG. 1 is a block diagram of a conventional motion vector estimating system.
Figure 2:
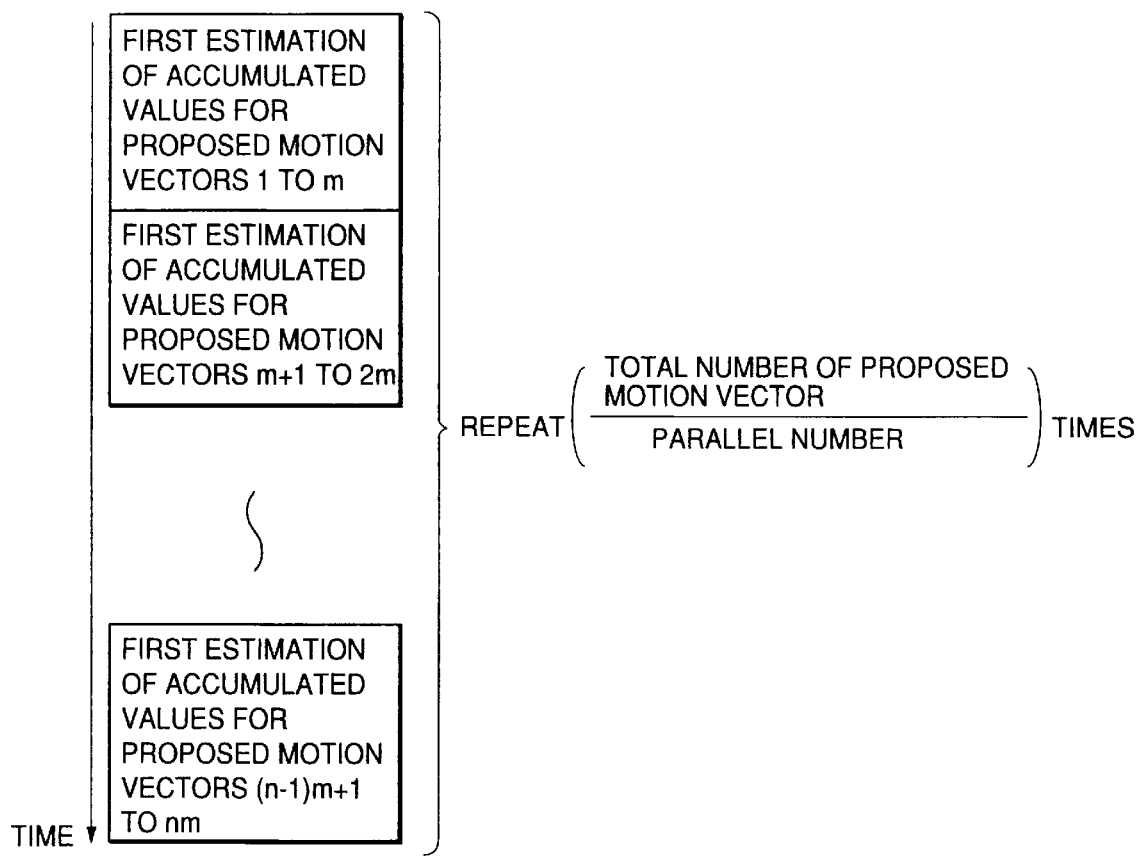
FIG. 2 is a time chart explaining the operation of the conventional motion vector estimating system.

The first preferred embodiment of a motion vector estimating system according to the present invention is different from the conventional motion vector estimating circuit shown in FIG. 1 at the point that the stop signal S4 outputted from the control means 5 and the accumulation stopping means 10 are additionally provided. In addition, the accumulation stopping means 10 outputs an all-proposal invalid signal S5, which starts the parallel processing for the next proposed motion vector immediately after all of the differential absolute-value accumulating circuits 2a through 2n are stopped, to the control means 5 in response to the respective outputs of the separate stop circuit 11. Also at this point, the first preferred embodiment of a motion vector estimating system according to the present invention is different from the conventional motion vector estimating system.

Figure 4:
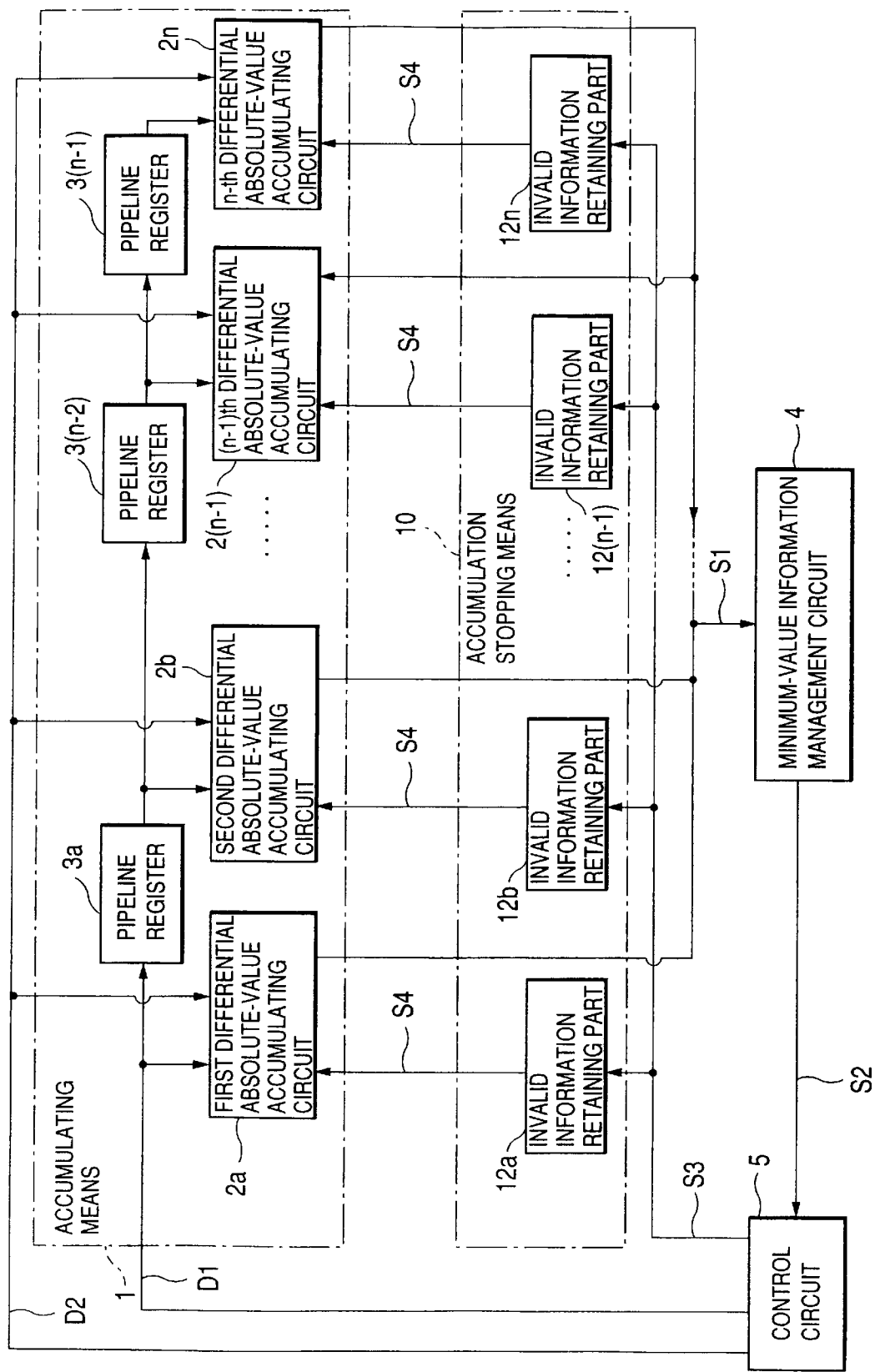
FIG. 4 is a block diagram of the second preferred embodiment of a motion vector estimating system according to the present invention.

Referring to FIG. 4, the second preferred embodiment of a motion vector estimating system, according to the present invention, will be described. This motion vector system has more detailed constructions than those of the accumulating means 1 and the accumulation stopping means 10 shown in FIG. 3. In FIG. 4, accumulating means 1 has first through n-th differential absolute-value accumulating circuits 2a through 2n as well as pipeline registers 3a through 3(n-1), similar to the conventional motion vector estimating system shown in FIG. 1. In addition, accumulation stopping means 10 has invalid information retaining parts 12a through 12n serving as separate stop circuits 11. Each of these invalid information retaining parts 12a through 12n retains invalid information about a corresponding one of the first through n-th differential absolute-value accumulating circuits 2a through 2n, and outputs a stop signal S4 to the corresponding accumulating circuit when the accumulation in the corresponding accumulating circuit is invalid.

An invalid control (determination) signal S3 supplied from the control means 5 to the invalid information retaining parts 12a through 12n controls the activation/inactivation of the stop signals S4 outputted from the invalid information retaining parts 12a through 12n. Furthermore, the second preferred embodiment of a motion vector estimating system according to the present invention does not output the all-proposal invalid signal S5 to the control means 5 unlike the first preferred embodiment.

Figure 5:
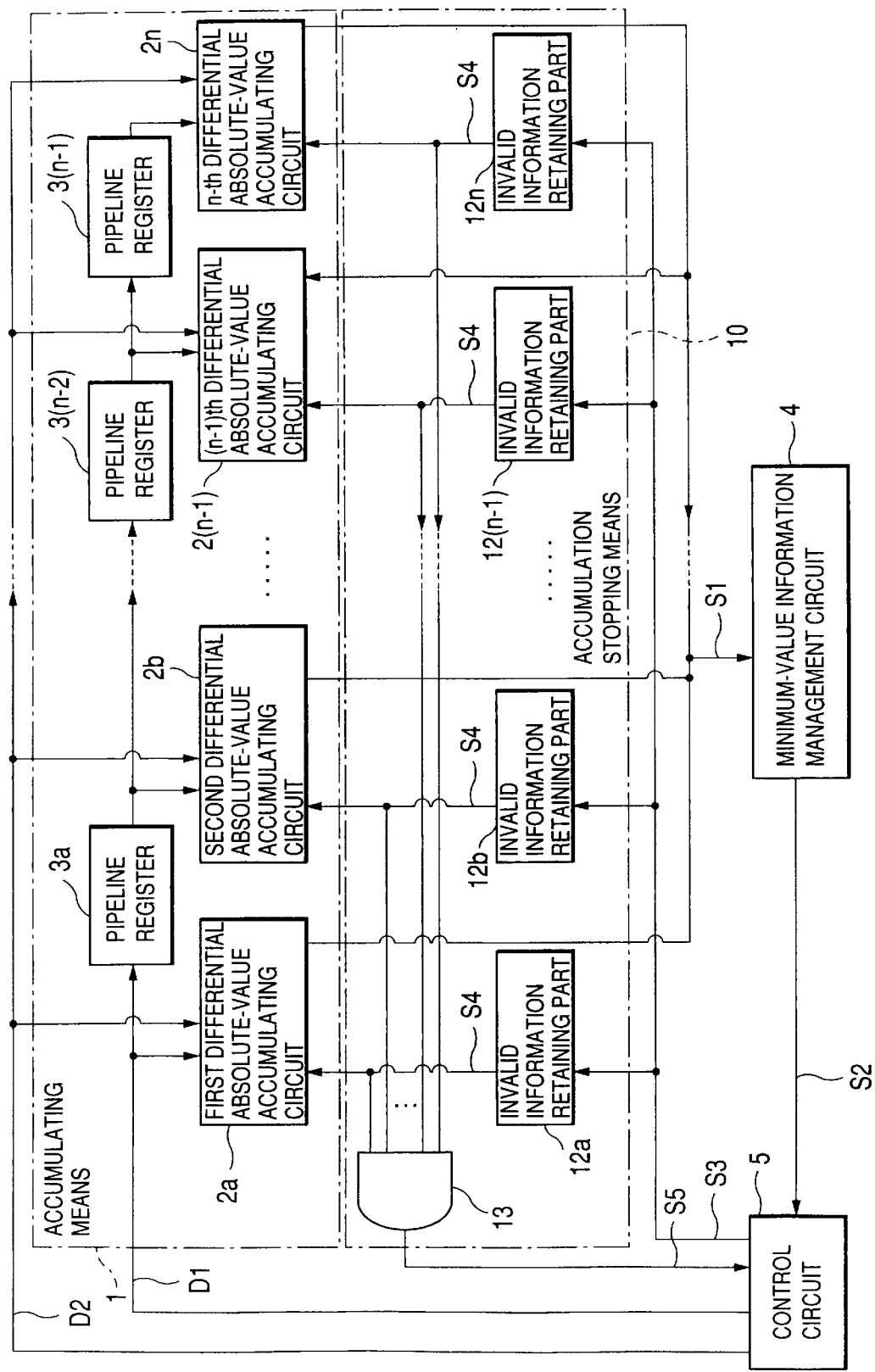
FIG. 5 is a block diagram of the third preferred embodiment of a motion vector estimating system according to the present invention.

The third preferred embodiment of a motion vector estimating system, according to the present invention, shown in FIG. 5 is different from the second preferred embodiment of a motion vector estimating system according to the present invention at the point that accumulation stopping means 10 has all-proposal invalid determining means 13. The all-proposal invalid determining means 13 comprises an AND circuit for receiving stop signals S4 outputted from respective invalid information retaining parts 12a through 12n to corresponding differential absolute-value accumulating circuits 2a thorough 2n to derive an AND.

The operation of the third preferred embodiment of a motion vector estimating system, according to the present invention, will be described. In order to estimate a motion vector, it is required to repeatedly estimate the accumulated values using all of motion vectors in a certain range as proposed motion vectors at least once. The control means 5 supplies an appropriate current image data D1 and a reference image data D2 to the accumulating circuits 2a through 2n. The reference image data D2 is sequentially transmitted to the pipeline registers 3a through 3(n-1). The accumulating circuits 2a through 2n calculate an absolute value of a luminance difference between the current image data D1 and the reference image data D2 as a signal difference value, and accumulate the signal difference values. The first through n-th differential absolute-value accumulating circuits 2a through 2n are initialized when the operation of a newly proposed motion vector is started. Each of the accumulating circuits 2a through 2n outputs an accumulated value S1 to a minimum-value information management circuit 4 when all of accumulations for the corresponding motion vectors are completed.

The minimum-value information management circuit 4 is initialized by the accumulated value S1 corresponding to the first proposed motion vector. Then, the minimum-value information management circuit 4 compares the minimum accumulated value retained therein with the accumulated value S1 outputted from each of the accumulating circuits 2a through 2n. When the supplied accumulated value is smaller than the retained value, the smaller accumulated value is replaced as a newly retained value. Every time the retained value of the minimum-value information management circuit 4 is replaced, the comparison result signal S2 is activated. When the comparison result signal S2 has been activated, the control means 5 updates stored information corresponding to a current valid motion vector.

Figure 6:
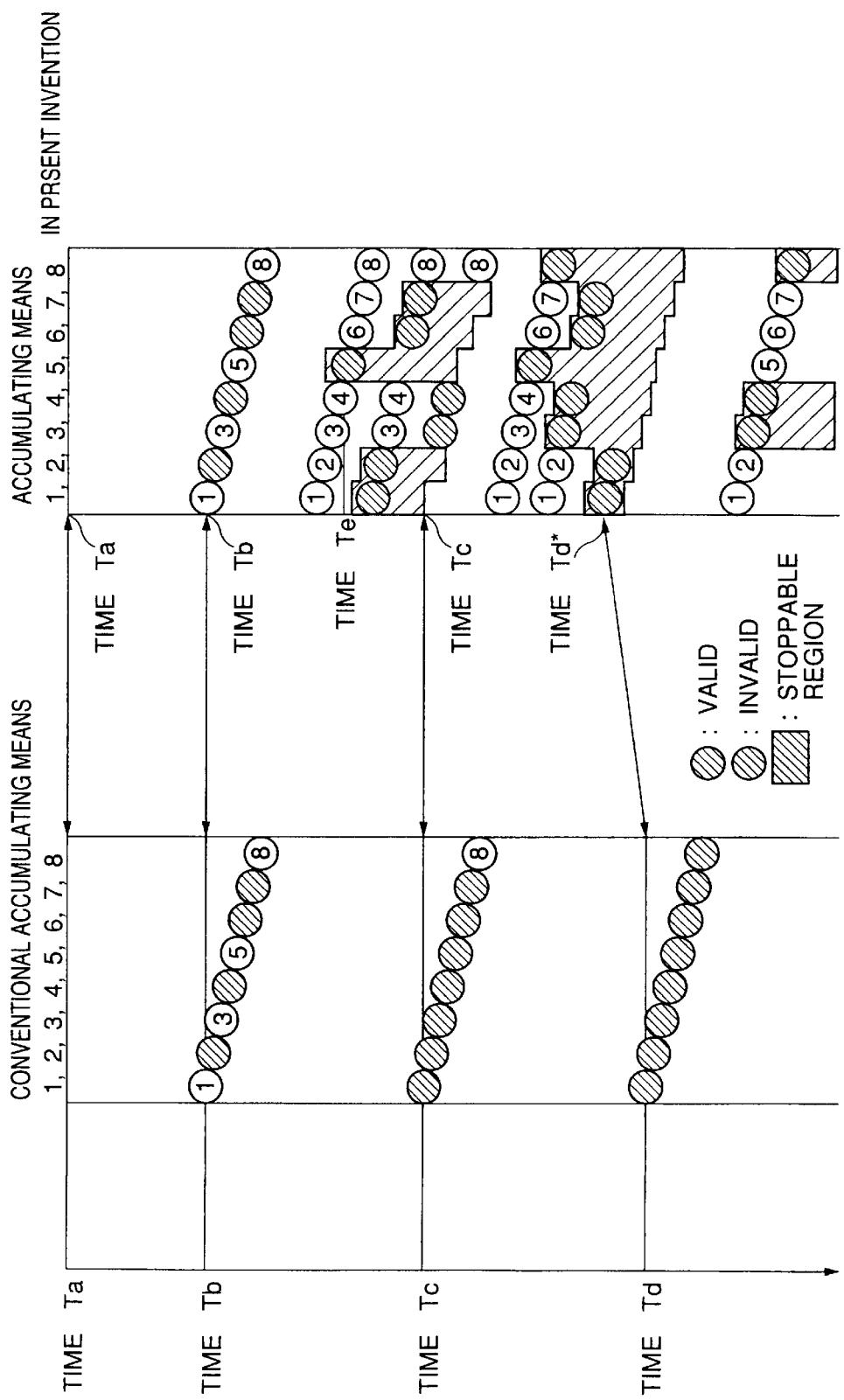
FIG. 6 is a time chart explaining the operation of the third preferred embodiment of a motion vector estimating system according to the present invention.

As shown in FIG. 6, the first operation of the proposed motion vector is the same as the conventional operation. From the second operation of the proposed motion vector, before the comparison is carried out when all of the accumulations are completed, the accumulated value S1 is received by means of the comparison result signal S2 with respect to each of the accumulating circuits 2a through 2n. At this time, the minimum-value information management circuit 4 compares the accumulated value S1 with the minimum retained value wherein no data is replaced. When the comparison result signal S2, that the partway accumulated value of the accumulated value S1 is equal to or greater than the value retained in the minimum-value information management circuit 4, is outputted, the control means 5 determines that this motion vector is invalid, and activates the invalid determining signal S3 and the corresponding accumulation stopping signal S4 to stop the operation of the corresponding one of the accumulating circuits 2a through 2n.

When the accumulation stopping signals S4 supplied to all of the accumulating circuits 2a through 2n are activated, the all-proposal invalid determining signal S5 serving as an AND output of the all-proposal invalid determining means 13 comprising the AND circuit, to which all of the accumulation stopping signals S4 are inputted, is activated. When the all-proposal invalid determining signal S5 is inputted to the control means 5, the control means 5 starts to initialize the invalid information retaining parts 12a through 12n and the first through n-th differential absolute-value accumulating circuits 2a through 2n, and supplies the current image data D1 and the reference image data D2, which correspond to a newly proposed motion vector, to the accumulating means 1 from the next cycle. After such operation is repeated, when the review of all of the proposed motion vectors is completed, the estimation operation of the motion vector is completed.

With respect to the accumulation estimating operation described above, the explanation of the difference of operation time between the conventional accumulating means and the accumulating means of the present invention will be supplemented using, as an example, eight accumulating means arranged in parallel as a pipeline. Since eight accumulating means arranged in parallel is used in this comparative example, it is assumed that the accumulation operations corresponding to eight proposed motion vectors are started at time Ta.

In the conventional example, the states that all of elements to be accumulated are accumulated are sequentially compared. In this example, proposals 1, 3, 5 and 8 are sequentially determined to be valid at time Tb, to be retained in the minimum-value information management circuit 4 as a minimum accumulated value, and the old value is canceled. After the time Tb, the next eight proposed motion vectors are selected, and the corresponding accumulation operation is started. In this case, as a result of the accumulation from the time Tb, it is determined at time Tc that the proposal 8 is finally valid, to be retained as the minimum accumulated value. At the time Tc, the accumulation operation corresponding to the next eight proposal motion vectors is started. In this case, it is determined that all of the proposed motion vectors are invalid, so that the accumulation result is not replaced at time Td. In the conventional motion vector estimating system, since there is no concept that the accumulation is stopped, three cycles of accumulation estimations are carried out from the time Ta to the time Td.

The accumulation operation of the motion vector estimating system, according to the present invention, will be described. The first accumulation operation, i.e., the operation from the time Ta to the time Tb, is the same as the conventional operation. According to the present invention, after the second accumulation, a plurality of comparisons are carried out until the accumulation of all of elements to be accumulated is completed. If it is determined that a partway accumulated value retained in a certain accumulating circuit is invalid on the grounds that it exceeds the minimum accumulated value at that time or the like, the subsequent accumulation operations in the accumulating circuit for retaining the accumulated value are insignificant. Therefore, such operations in the accumulating circuit are immediately stopped to save the processing time required for the accumulation operation. That is, since it is determined at time Te that the partway accumulated value corresponding to a proposed motion vector 5 is invalid, the operation of the fifth accumulating circuit is stopped until the accumulation for a newly proposed motion vector is started.

In addition, when the accumulation of all of elements to be accumulated is completed, all of eight accumulated values may be determined to be invalid. This corresponds to the third accumulation in the conventional example. In such a case, the motion vector estimating system of the present invention starts the accumulation corresponding to a newly proposed motion vector when all of eight partway accumulated values are determined to be invalid during the accumulation. In the example shown in FIG. 6, when the partway accumulated value b 2is determined to be invalid at time Td*, all of eight partway accumulated values are determined to be invalid, so that the accumulation for a newly proposed motion vector is immediately started.

If the motion vector estimation is completed earlier than expected, the motion vector estimating operation itself can be also stopped. In a motion vector estimating system of an integrated circuit or the like, various costs can be reduced by stopping the motion vector estimating operation by stopping a clock power supply or the like. If the present invention is applied to such a circuit, it is possible to obtain remarkable advantages.

In the first through third preferred embodiments described above, an identification threshold is equal to the retained value of the minimum-value information management circuit 4. Therefore, a conventional circuit can be used as the comparator used for the comparison of the partway accumulated value with the retained value, so that it is not required to greatly increases the circuit construction. Thus, in the first through third preferred embodiments of a motion vector estimating system according to the present invention, it is possible to increase the activation rates of the respective accumulating circuits 2*a* through 2*n* to decrease the electric power consumption.

Furthermore, while the motion vector estimating system has used the variable invalid determining signal S3 as the identification threshold in the first through third preferred embodiment, the present invention should not be limited thereto, but a fixed value may be used as the identification threshold as described in the following fourth preferred embodiment.

Figure 7:
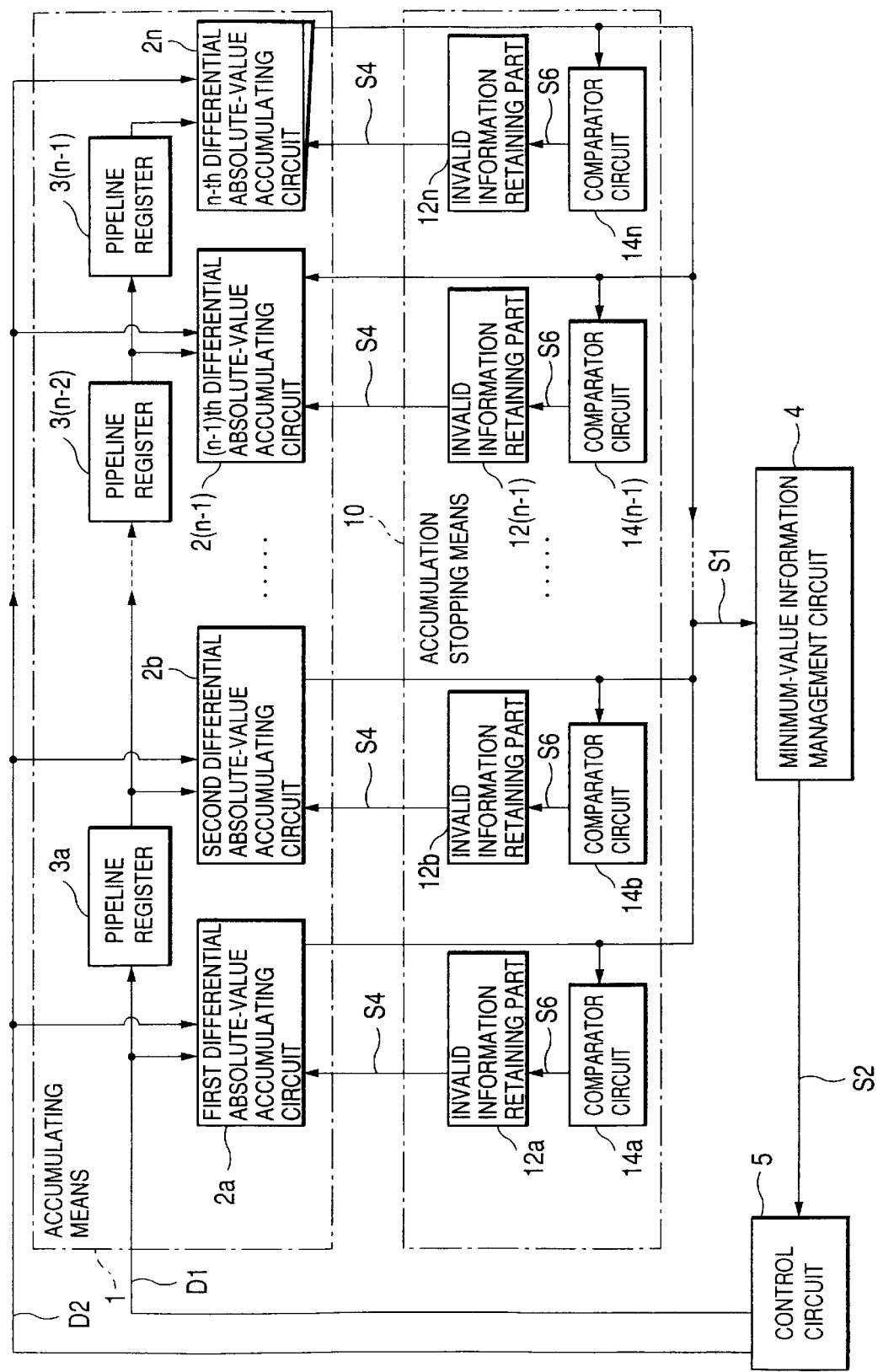
FIG. 7 is a block diagram of the fourth preferred embodiment of a motion vector estimating system according to the present invention.

FIG. 7 is a block diagram of the fourth preferred embodiment of a motion vector estimating system according to the present invention. In this fourth preferred embodiment, the signal line for the invalid determining signal S3 is removed from the motion vector estimating system in the second preferred embodiment shown in FIG. 4, and a fixed value is used as the identification threshold. In FIG. 7, the invalid determining signal S3 is not only omitted, but there are also provided comparator circuits 14*a*, 14*b* through 14(*n*-1) and 14*n* for comparing the partway accumulated value of each of accumulated signals S1 outputted from accumulating circuits 2*a*, 2*b* through 2(*n*-1) and 2*n* with a fixed value serving as an identification threshold. With this construction, in the motion vector estimating system of this fourth preferred embodiment, an invalid determining signal S6 is prepared for each of the accumulating circuits 2*a* through 2*n*, and a stop signal S4 for stopping the accumulation of each of the accumulating circuits 2*a* through 2*n* is outputted in response to the invalid determining signal S6.

In the motion vector estimating system of the fourth preferred embodiment, when the accumulated value signal S1 of each of the accumulating circuits 2*a* through 2*n* is determined to be invalid by means of the corresponding one of the comparator circuits 14*a* through 14*n*, the invalid determining signal S6 outputted from the corresponding comparator circuit is activated, so that the accumulating operation of the corresponding accumulating circuit is stopped.

Furthermore, while each of the comparator circuits 14*a* through 14*n* has been provided for the corresponding one of the accumulating circuits 2*a* through 2*n* in the motion vector estimating system of the fourth preferred embodiment, the present invention should not be limited thereto, but a single comparator circuit, which can be commonly applied to all of the accumulating circuits, may be provided to be time shared. Also in this motion vector estimating system of the fourth preferred embodiment, it is possible to improve the activation rates of the accumulating circuits 2*a* through 2*n* to reduce the electric power consumption.

Figure 8:
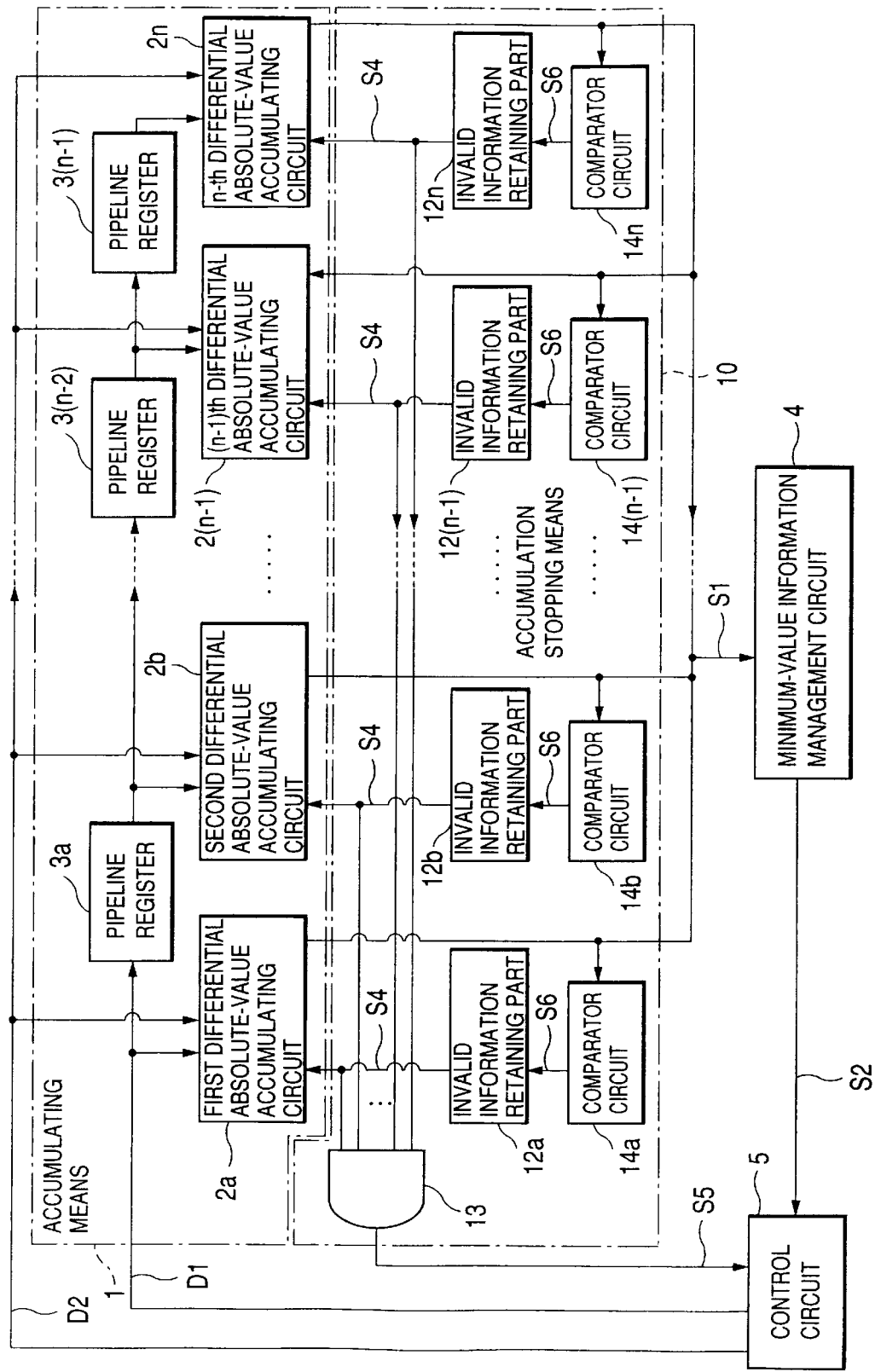
FIG. 8 is a block diagram of the fifth preferred embodiment of a motion vector estimating system according to the present invention.

Referring to FIG. 8, the fifth preferred embodiment of a motion vector estimating system, according to the present invention, will be described below.

In this preferred embodiment, the motion vector estimating system has all-proposal invalid determining means 13, which comprises an AND circuit for deriving an AND of stop signals S4 outputted from invalid information retaining parts 12*a* through 12*n*, in addition to the construction of the motion vector estimating system in the fourth preferred embodiment. Therefore, similar to the operation of the third preferred embodiment shown in FIG. 5, the motion vector estimating system in the fifth preferred embodiment carries out the following operation.

That is, when the accumulation stopping signals S4 supplied to all of accumulating circuits 2*a* through 2*n* are activated, an all invalid determining signal S5 serving as an AND output of the all-proposal invalid determining means 13 comprising an AND circuit, to which all of the accumulation stopping signals S4 are inputted, is activated. When the all invalid determining signal S5 is inputted to control means 5, the control means 5 starts to initialize the invalid information retaining parts 12*a* through 12*n* and the first through n-th differential absolute-value accumulating circuits 2*a* through 2*n*, and supplies a current image data D1 and a reference image data D2, which correspond to a newly proposed motion vector, to accumulating means 1 from the next cycle. When such operation is repeated in a predetermined cycle to complete the review of all of proposed motion vectors, the motion vector estimating operation is completed.

Figure 9:
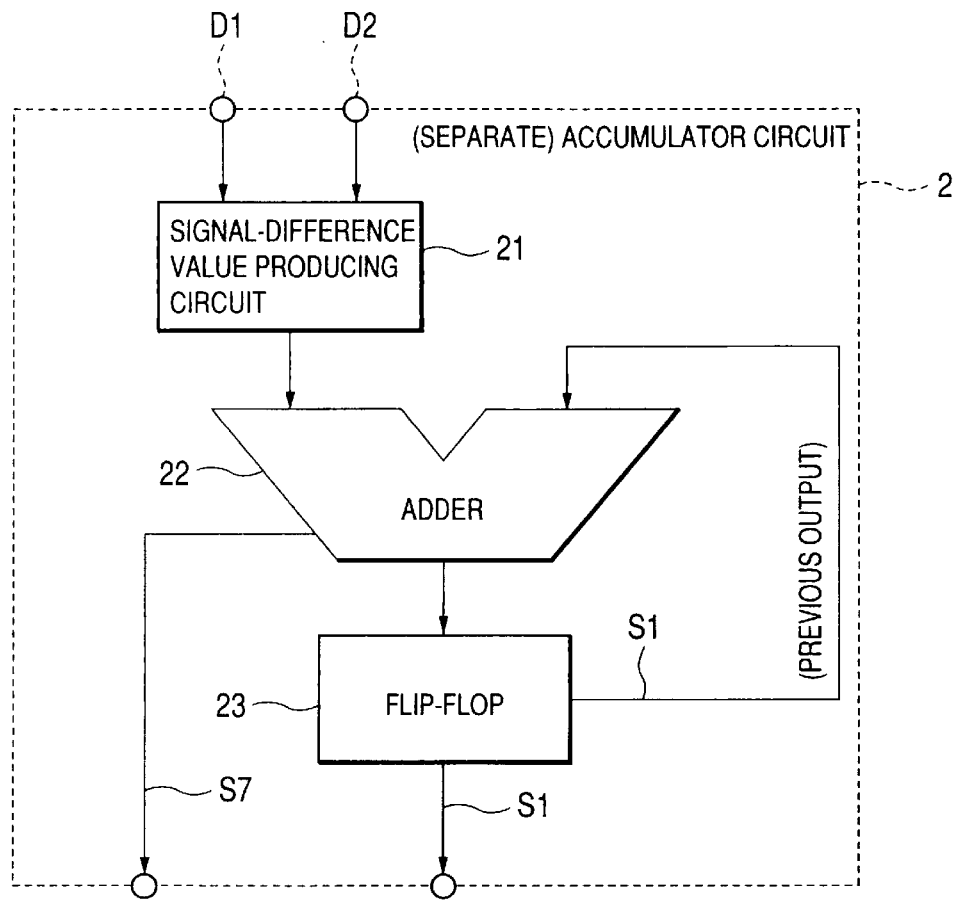
FIG. 9 is a block diagram of an accumulator circuit of the sixth preferred embodiment of a motion vector estimating system according to the present invention.

In the motion vector estimating systems of the fourth and fifth preferred embodiment shown in FIGS. 7 and 8, the identification threshold is the fixed value. Therefore, when the fixed value is set to be equal to the maximum number, which can be retained by the accumulating circuits, a comparator can be incorporated into each of the accumulating circuits 2*a* through 2*n* at very low costs. FIG. 9 shows the sixth preferred embodiment of a motion vector estimating system, according to the present invention, which includes a comparator capable of being incorporated into the fourth and fifth preferred embodiments of a motion vector estimating system according to the present invention.

In FIG. 9, which shows the sixth preferred embodiment of a motion vector estimating system according to the present invention, a separate accumulator circuit 2 comprises a signal-difference producing circuit 21 for calculating a signal difference of a current image data D1 and a reference image data D2 to produce a signal difference value, an adder 22 for adding the signal difference value to the output of the separate accumulator circuit 2, and an accumulated-value retaining flip-flop 23 for retaining the accumulation result of the adder 22. The operation of this accumulator circuit will be described below.

The signal-difference producing circuit 21 calculates a difference between the current image data D1 and the reference image data D2 to output the signal difference value to the adder 22. The adder 22 adds the signal difference value to the last accumulated value S1 serving as a final output of the accumulator circuit 2. The flip-flop 23 retains the accumulated value S1 added for the next accumulating operation, and sequentially accumulates the current accumulated value S1 on the last accumulated value to output the resulting value. Furthermore, the adder 22 is prepared so as to output a number with digits, which are greater than the digits retained by the flip-flop 23 by one digit, as an accumulation result, so that it is possible to determine that the accumulated value exceeds the identification threshold, i.e., the maximum value which can be retained by the flip-flop 23, by the output corresponding to the most significant digit of the adder 22. Therefore, the adder 22 outputs the output corresponding to the most significant digit as a determination signal S7 for determining whether "the accumulated value>the identification threshold".

When the most significant digit of the adder 22 is activated, "the accumulated value>the identification threshold", so that the determination signal S7 is activated. On the other hand, although the value retained in the flip-flop circuit 23 is an incorrect value, this value is not used since the information that the accumulated value is invalid is retained in the outside of the accumulator circuit 2. Therefore, there is substantially no problem.

Figure 10:
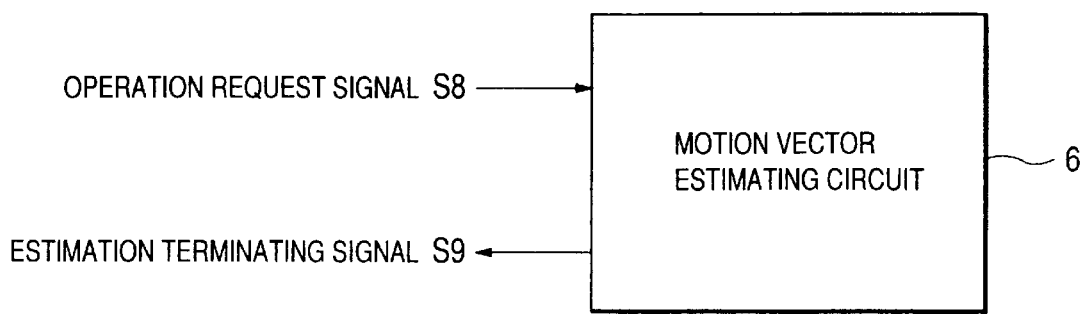
FIG. 10 is a block diagram of the seventh preferred embodiment of a motion vector estimating system according to the present invention.

Referring to FIG. 10, the seventh preferred embodiment of a motion vector estimating system, according to the present invention, will be described below.

As shown in FIG. 10, this motion vector estimating system has a motion vector estimating circuit 6, which inputs an operation request signal S8 and outputs an estimation terminating signal. In the first through seventh preferred embodiment described above, the number of processing cycles of the motion vector estimating system is an indefinite value having a fixed worst value. There is a technique for deriving a motion vector after the elapse of the worst value of cycles. However, if the next processing is started immediately after the motion vector estimation is completed, a high-speed processing can be statistically carried out. With the construction described above, the motion vector estimating system in the seventh preferred embodiment can carry out a high-speed operation.

That is, when the operation request signal S8 is activated, the motion vector estimating circuit 6 starts to operate, and continues to estimate a motion vector by means of accumulator circuits (not shown). Thereafter, when the motion vector estimation is completed, the estimation terminating signal S9 is activated. When the estimation terminating signal S9 is activated, the motion vector estimating circuit 5 suitably outputs a motion vector and a minimum-value accumulated value, and stops the operation of the motion vector estimating circuit 6 itself, e.g., by stopping the clock, until the next operation request signal S8 is activated.

As described above, the motion vector estimating system in the seventh preferred embodiment can greatly decrease the electric power consumption of the motion vector estimating circuit by outputting the motion terminating signal S9 and stopping the operation of the whole motion vector estimating circuit when outputting the motion terminating signal S9.

Figure 11:
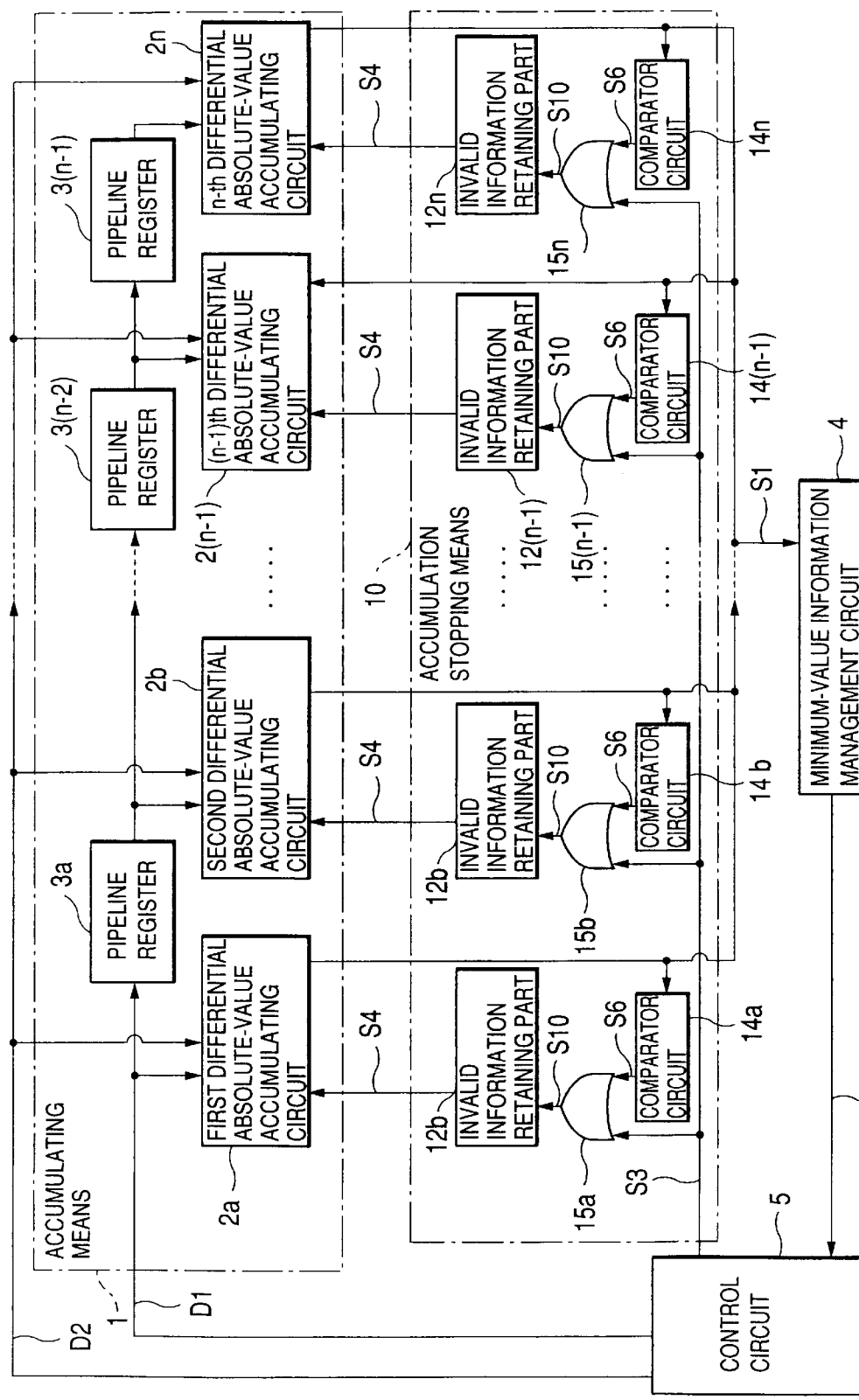
FIG. 11 is a block diagram of the eighth preferred embodiment of a motion vector estimating system according to the present invention.

Referring to FIG. 11, the eighth preferred embodiment of a motion vector estimating system, according to the present invention, will be described in detail below.

In this eighth preferred embodiment, the motion vector estimating system can effectively save the electric power by setting a plurality of identification thresholds. In the eight preferred embodiment, the motion vector estimating system has a combined construction of those in the second and fourth preferred embodiments. That is, in FIG. 11, the motion vector estimating system comprises accumulating means 1, a minimum-value information management circuit 4, a control circuit 5 and accumulation stopping means 10, and has the same constructions as the motion vector estimating systems in the preceding preferred embodiments, except for the construction of the accumulation stopping means 10.

In the motion vector estimating system of the eighth preferred embodiment, the accumulation stopping means 10 comprises: invalid information retaining parts 12a through 12n; comparator circuits 14a through 14n, each of which is provided for the corresponding one of the invalid information retaining parts 12a through 12n and each of which compares an accumulated value signal S1, which is outputted from the corresponding one of differential absolute-value accumulating circuits 2a through 2n, with an identification threshold of a fixed value to output an invalid determining signal S6; and stop determining circuits 15a through 15n, each of which is provided for the corresponding one of the invalid information retaining parts 12a through 12n and each of which comprises an OR circuit for deriving an OR of the invalid determining signal S6 of the fixed value outputted from each of the comparator circuits 14a through 14n and an invalid determining signal S3 of a variable value outputted from the control circuit 5.

Each of the stop determining circuits 15a through 15n derives the OR of the invalid determining signals S3 and S6 of the variable and fixed values outputted from the control circuit 5 and the comparator circuits 14a through 14n, respectively. When it is determined that at least one signal is invalid, each of the stop determining circuits 15a through 15n outputs a stop determining signal S10 to the corresponding one of the differential absolute-value accumulating circuits 2a through 2n. That is, each of the comparator circuits 14a through 14n retaining the identification threshold as the fixed value activates the invalid determining signal S6 of the fixed value, when the corresponding one of the differential absolute-value accumulating circuits 2a through 2n exceeds the identification threshold so that the accumulated value signal S1 is invalid. In addition, the control circuit 5 activates the invalid determining signal S3 due to the variable identification threshold when the accumulating circuit is stopped in response to the comparative result indicative signal S2 outputted from the minimum-value information management circuit 4. When the partway accumulated value of the accumulated value signal S1 of the corresponding one of the differential absolute-value accumulating circuits 2a through 2n is in the state that the accumulation should be stopped, the corresponding one of the stop determining circuits 15a through 15n activates the stop determining signal S10 to stop the corresponding one of the differential absolute-value accumulating circuits 2a through 2n.

Therefore, according to the motion vector estimating system in the eight preferred embodiment, it is possible to more effectively determine the valid/invalid of the accumulated value than the motion vector estimating system wherein the valid/invalid identification threshold is any one of a variable value and a fixed value, so that it is possible to quickly carry out the motion vector estimating operation to greatly save the electric power consumption.

Furthermore, in the motion vector estimating system of this eight preferred embodiment, an all-proposal invalid determining signal S5 may be outputted to the control circuit 5, similar to the third through fifth preferred embodiments.

Figure 12:
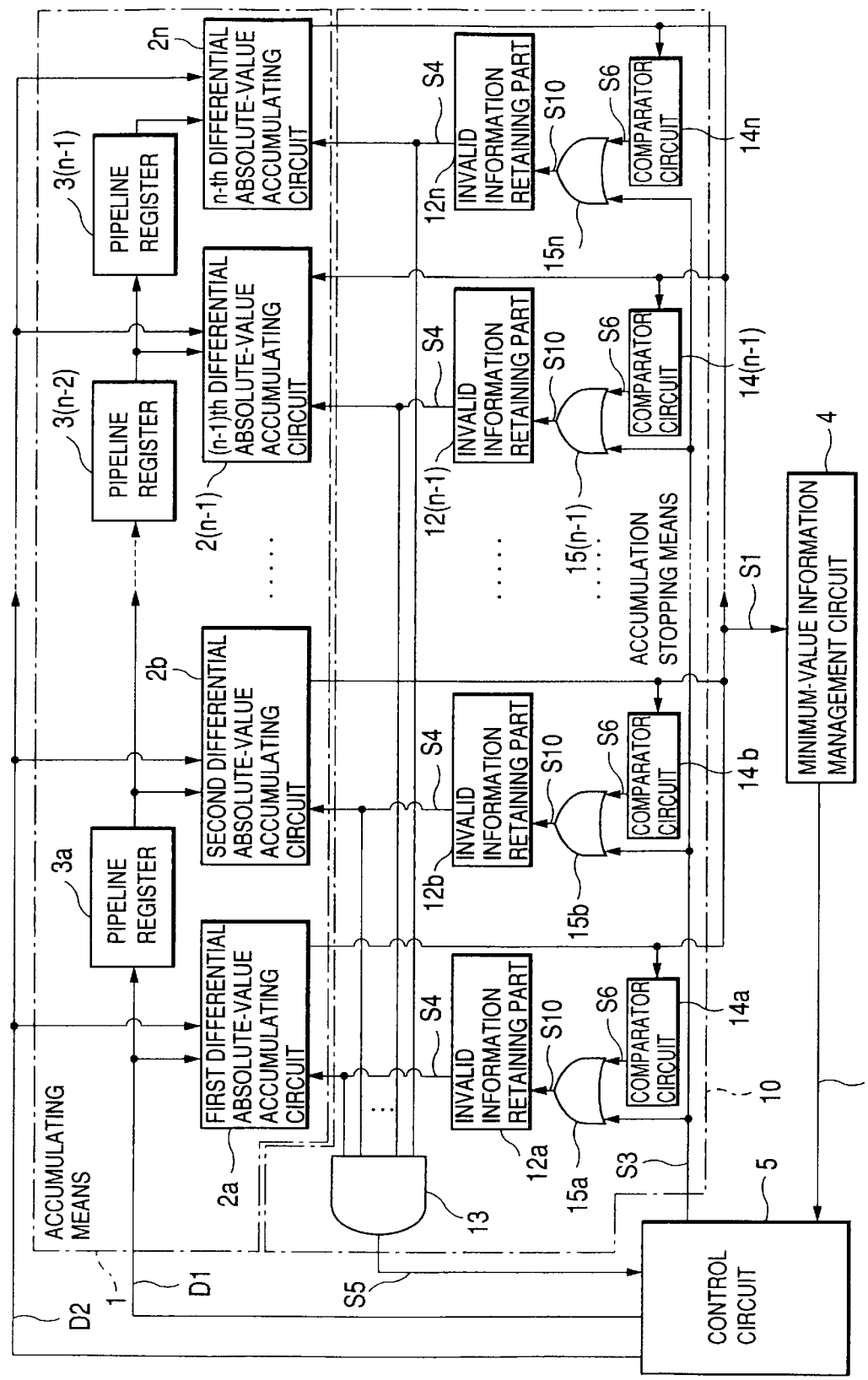
FIG. 12 is a block diagram of the ninth preferred embodiment of a motion vector estimating system according to the present invention.

FIG. 12 shows the ninth preferred embodiment of a motion vector estimating system according to the present invention. In this figure, the motion vector estimating system has substantially the same construction as that of the motion vector estimating system in the eighth preferred embodiment shown in FIG. 11, except that accumulation stopping means 10 is provided with an AND circuit. That is, the accumulation stopping means 10 comprises: invalid information retaining parts 12a through 12n; comparator circuits 14a through 14n, each of which is provided for the corresponding one of the invalid information retaining parts 12a through 12n and each of which compares an accumulated value signal S1, which is outputted from the corresponding one of differential absolute-value accumulating circuits 2a through 2n, with an identification threshold of a fixed value to output an invalid determining signal S6; and stop determining circuits 15a through 15n, each of which is provided for the corresponding one of the invalid information retaining parts 12a through 12n and each of which comprises an OR circuit for deriving an OR of the invalid determining signal S6 of a fixed value outputted from the corresponding one of the comparator circuits 14a through 14n and an invalid determining signal S3 of a variable value outputted from a control circuit 5. In addition, the accumulation stopping means 10 includes all-proposal invalid determining means 13, which comprises an AND circuit for deriving an AND of stop signals S4 outputted from the respective invalid information retaining parts 12a through 12n. Therefore, in the ninth preferred embodiment, the operation of the motion vector estimating system is similar to those of the third through fifth preferred embodiments shown in FIGS. 5 through 8, as will be described below.

That is, when the accumulation stopping signals S4 supplied to the all of the accumulating circuits 2a through 2n are activated, the all invalid determining signal S5 being the AND output of the all-proposal invalid determining means 13 comprising the AND circuit, to which all of the accumulation stopping signals S4 are inputted, is activated. When the all invalid determining signal S5 is inputted to the control means 5, the control means 5 starts to initialize the invalid information retaining parts 12a through 12n and the first through n-th differential absolute-value accumulating circuits 2a through 2n, and supplies a current image data D1 and a reference image data D2, which correspond to a newly proposed motion vector, to the accumulating means 1 from the next cycle. When the review of all of the proposed motion vectors is completed by repeating such operation times of predetermined cycles, the motion vector estimating operation is completed.

Furthermore, while the signal-strength difference derived from the current and reference image data has been derived from the luminance-difference signal in the preferred embodiments described above, the present invention should not be limited thereto, but another signal attribute, e.g., a color-difference signal, may be used. When a picture signal standard of a different system will be adopted in future, a signal of another name representing an image information at a specific position of a frame may be utilized.

While some preferred embodiments of a motion vector estimating system according to the present invention have been described, the present invention is also directed to a motion vector estimating method in each of the motion vector estimating systems of various construction described above.

Figure 13:
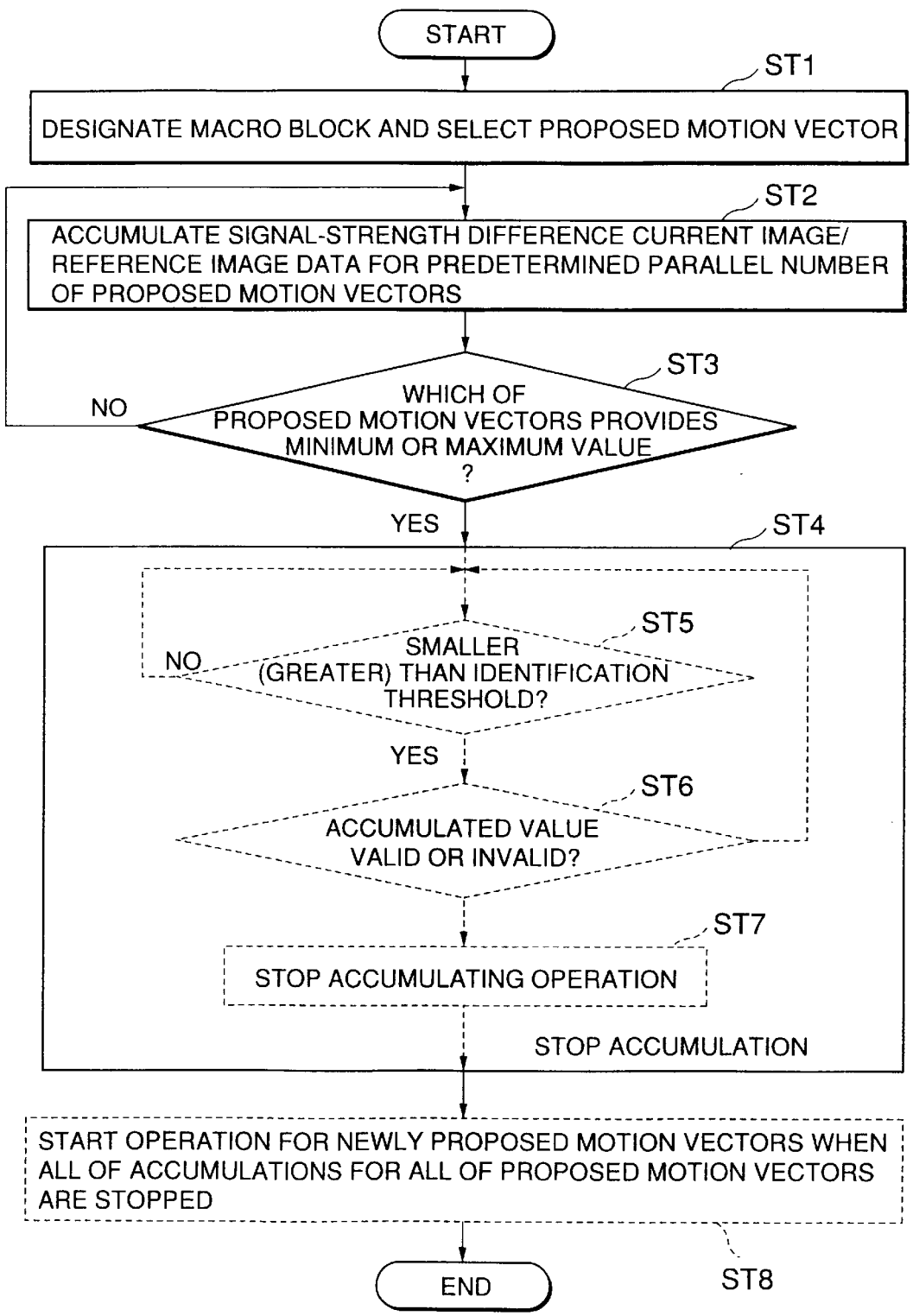
FIG. 13 is a flow chart showing the tenth preferred embodiment of a motion vector estimating method according to the present invention.

FIG. 13 is a flow chart showing the tenth preferred embodiment of a motion vector estimating method according to the present invention. As shown in FIG. 13, first, at step ST1, an image in a predetermined range of a frame/field is designated as a macro block, and a plurality of proposed motion vectors existing in this macro block are selected. Then, at step ST2, signal-strength differences of the corresponding picture elements between a current image and a reference image for a predetermined parallel number of proposed motion vectors of the plurality of proposed motion vectors in the designated macro block are calculated, in parallel, to be accumulated for each of specific proposed motion vectors processed in parallel. Then, at step ST3, it is determined whether the accumulation result of the minimum or maximum value is identified for any one of the predetermined parallel number of proposed motion vectors processed in parallel. If the minimum or maximum value is not identified, the accumulation is repeated. At step ST3, when a partway accumulated value for any one of proposed motion vectors is identified as the minimum or maximum value, the accumulation for the proposed motion vector is stopped at step ST4.

In FIG. 13, the step ST4 for stopping the accumulation for a certain proposed motion vector may include the following steps. That is, the step ST4 includes: step ST5 for comparing a partway accumulated value for each of the proposed motion vectors processed in parallel with a predetermined identification threshold at least once; step ST6 for determining the valid/invalid of the accumulated value for each of the proposed motion vectors on the basis of the comparison results obtained at step ST5; and step ST7 for stopping the accumulating operation for the corresponding proposed motion vector until the accumulation of a newly proposed motion vector is started when it is determined that the accumulated value is invalid.

After the step ST7 for stopping the accumulation, there may be provided step ST8 for disqualifying all of the proposed motion vectors, for each of which the accumulation is carried out by the parallel processing, to start the parallel processing for a newly proposed motion vector immediately after all of the accumulation results for all of the proposed motion vectors processed in parallel are stopped.

Figure 14:
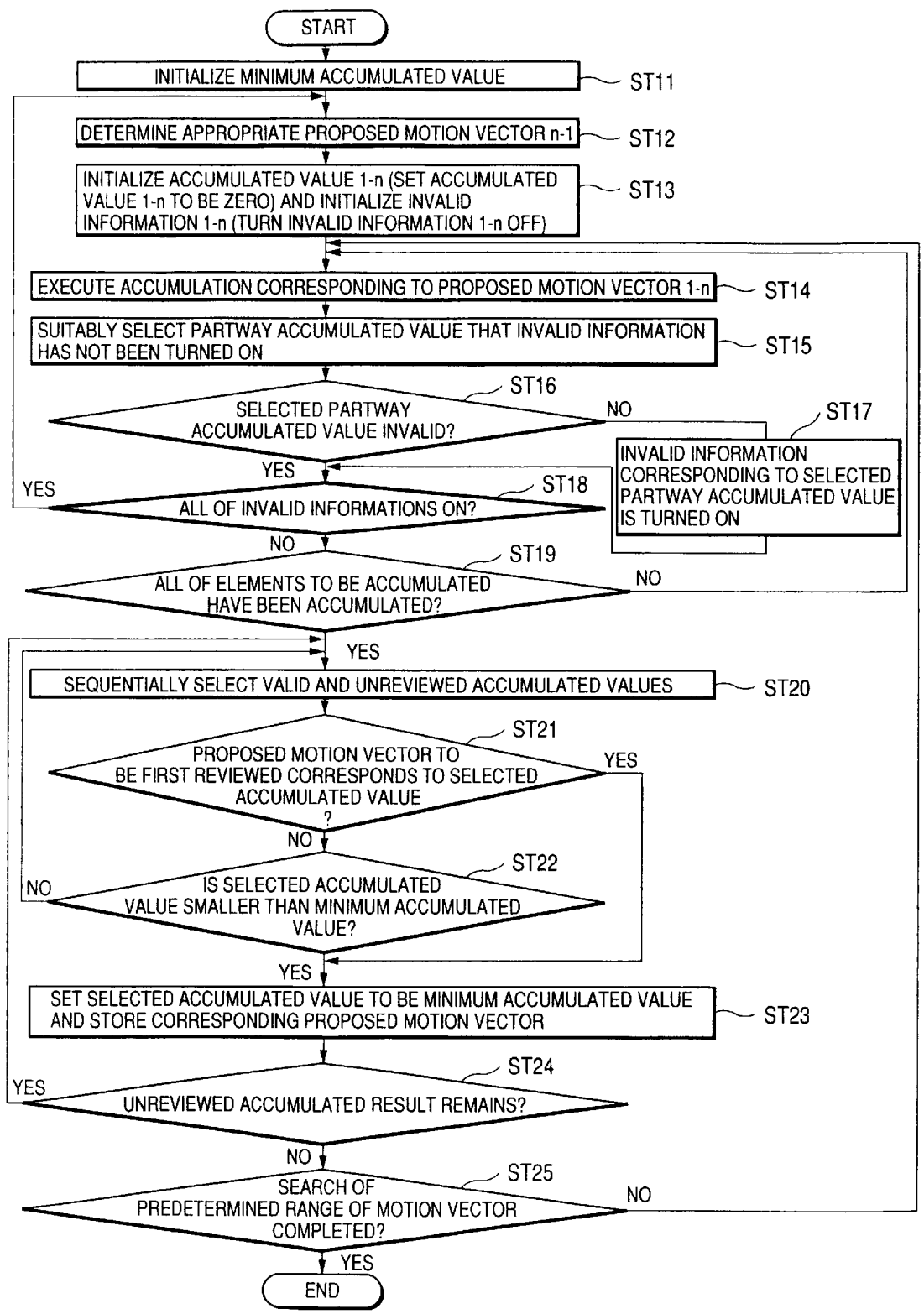
FIG. 14 is a flow chart showing the eleventh preferred embodiment of a motion vector estimating method according to the present invention.

FIG. 14 is a flow chart of the eleventh preferred embodiment of a motion vector estimating method according to the present invention. In this eleventh preferred embodiment, the motion vector estimating method carries out more detailed processing operation than that of the eleventh preferred embodiment. In FIG. 14, first, the minimum accumulated values of the differential absolute-value accumulating circuits corresponding to the parallel number are initialized (step ST11), and an appropriate proposed motion vector 1-n is determined (step ST12). Then, an accumulated value 1-n is set to be zero to be initialized, and an invalid information 1-n is turned off to be initialized (step ST13). Thereafter, the accumulation corresponding to the proposed motion vector 1-n is executed (step ST14), and a partway accumulated value, wherein invalid information is not turned on, is suitably selected (step ST15).

At the next step ST16, it is determined whether the selected partway accumulated value is valid. When it is invalid, the invalid information corresponding to the selected partway accumulated value is turned on (step ST17), and then, it is determined at step ST18 whether all of the invalid information 1-n is turned on. When it is determined at step ST18 that the selected partway accumulated value is valid, the routine goes directly to the step ST18. When it is determined at the step ST18 that all of the invalid information 1-n is turned on, the routine returns to the step ST12, so that the processing operations of ST 12 through ST17 are repeated. When it is determined at the step ST18 that all of the invalid information 1-n is not turned on, it is determined whether all of elements to be accumulated have been accumulated. When all of the elements to be accumulated have not been accumulated, the routine returns to the step ST14, and the processing operations of ST14 through ST19 are repeated.

When it is determined at the step ST19 that all of the elements to be accumulated have been accumulated, valid and unreviewed accumulated values are sequentially selected (step ST20). Then, it is determined at step ST21 whether the proposed motion vector corresponding to the selected accumulated value is a proposed motion vector to be first reviewed. When it is determined that the proposed motion vector corresponding to the selected accumulated value is not the proposed motion vector to be first reviewed, it is determined at the next step ST22 whether the selected accumulated value is smaller than the minimum accumulated value. When it is determined at the step ST22 that the selected accumulated value is not smaller than the minimum accumulated value, the routine returns to the step ST20, and the processing operations of the steps ST20 through ST22 are repeated.

If it is determined at the step ST22 that the proposed motion vector corresponding to the selected accumulated value is the proposed motion vector to be first reviewed, or if it is determined at the step ST22 that the selected accumulated value is smaller than the minimum accumulated value, the selected accumulated value is set to be the minimum accumulated value and the corresponding proposed motion vector is recorded at the next step ST23. Then, it is determined at step ST24 whether unreviewed accumulated values remain in the accumulation results. When the unreviewed accumulated values remain in the accumulation results, the routine returns to the step ST20, and the operations of the steps ST20 through ST24 are repeated. When it is determined at the step ST24 that unreviewed accumulated values do not exist in the accumulation results, it is determined at final step ST25 whether the search of a predetermined range of motion vectors is completed. When it is determined at the step ST25 that the search of the predetermined range of motion vectors is not completed, the routine returns to the step ST14, and the processing operations of the steps ST14 through ST25 are repeated. When it is determined at the step ST25 that the search of the predetermined range for the motion vectors is completed, a series of processing routines are completed.

Figure 15:
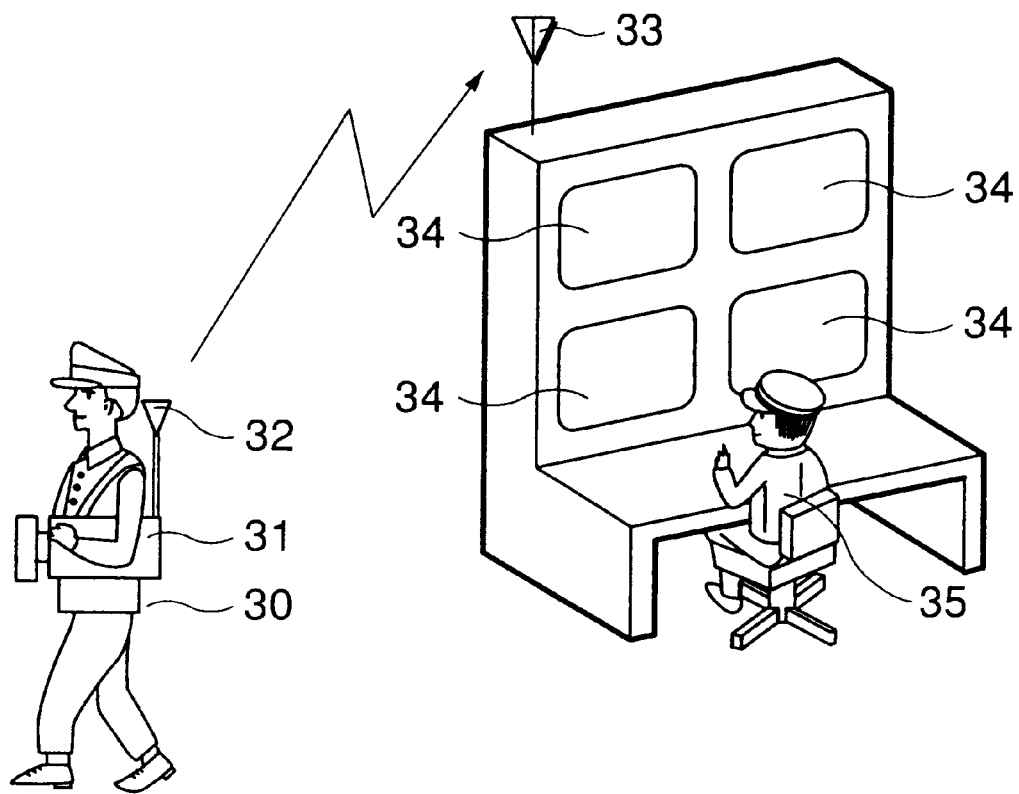
FIG. 15 is a perspective view of a first application of a motion vector estimating system according to the present invention.

Finally, referring to FIGS. 15 through 17, applications of the present invention will be described. FIG. 15 shows an example of a security system, to which a motion vector estimating system of the present invention is applied. In FIG. 15, a security camera 31 possessed by a guard 30 uses a LSI (Large Scale Integrated circuit) chip standardized by MPEG4 or the like, on which the motion vector estimating system of the present invention is mounted. An image is transmitted to an antenna 33 of a control panel in a central monitoring room via an antenna 32 of the camera 31 using a radio communication. The image taken by the guard 30 is displayed on a display CRT (Cathode Ray Tube) mounted on the control panel in the central monitoring room. In the central monitoring room, another guard 35 can monitor the image on the screen of the CRT 34. In this case, since the motion vector estimating system of the present invention is applied to the motion detecting operation, it is possible to quickly carry out the motion detection by low electric power consumption, and it is possible to sequentially use the camera for a long time.

Figure 16:
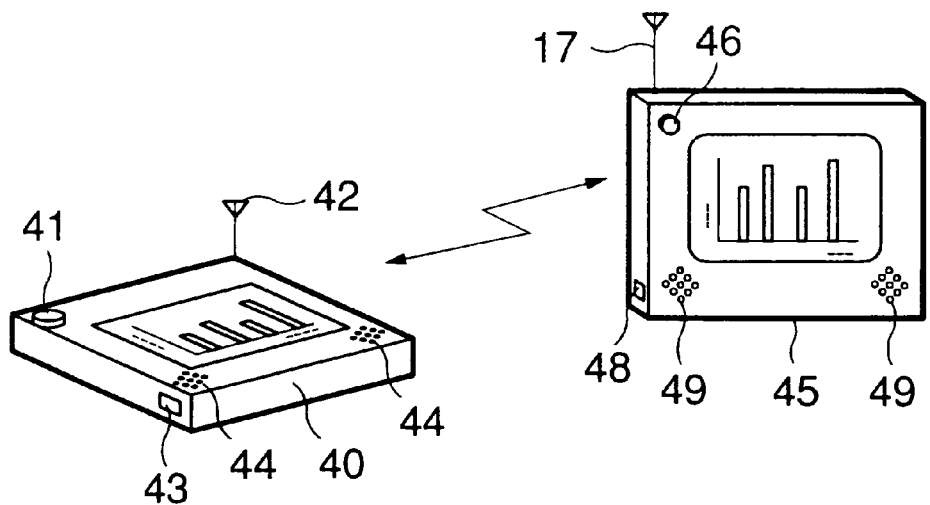
FIG. 16 is a perspective view of a second application of a motion vector estimating system according to the present invention.

Referring to FIG. 16, a portable information terminal serving as a second application of a motion vector estimating system, according to the present invention, will be described below.

In FIG. 16, reference numbers 40 and 45 denote portable information terminals, each of which comprises a portable telephone with a cameral or the like. Each of the portable information terminals 40 and 45 comprises a miniature camera 41 or 46 of a CCD (Charge Coupled device) or the like, an antenna 42 or 47 for communicating with the other portable information terminal serving as a monitor for a visitor or guest via a public channel, a microphone 43 or 48 for inputting voice, and a speaker 44 or 49 for outputting voice. While the portable information terminals 40 and 45 have had the same construction in this second application, the other terminal may be not a portable terminal. The portable information terminal 40 or 45 uses a LSI chip standardized by MPEG4 or the like, so that it is possible to reduce the electric power consumption and it is possible to use the terminal for a long time.

Figure 17:
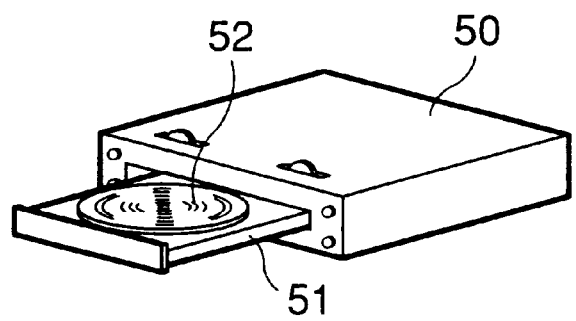
FIG. 17 is a perspective view of a third application of a motion vector estimating system according to the present invention.

Referring to FIG. 17, a DVD (Digital Versatile Disc) system serving as a third application of a motion vector estimating system, according to the present invention, will be described below. This DVD system 50 is formed as a portable system. In the DVD system 50, a DVD 52 is mounted on a front loading part 51 to reproduce an image on a monitor (not shown) or the like. If a small, portable liquid crystal display is used as the monitor, a good watching space can be provided even outside. In this case, if an image compression LSI incorporating a motion vector estimating system of the present invention is mounted on an image recorder deck for MPEG2 serving as the DVD system, it is possible to reduce the electric power consumption of the deck, and it is possible to surely carry out the motion compensation for image reproduction and so forth.

A motion vector estimating system according to the present invention can be mounted on a monitoring camera for secret monitoring, a security camera or the like, although these applications are not shown. A video camera used for such applications may be incorporated in, e.g., a flowerpot or a stuffed doll. In this case, it is often difficult to supply electric power to the video camera, and the video camera is often driven mainly by means of a battery or the like. Therefore, if a motion vector estimating system of the present invention is applied to a LSI for MPEG4, it is possible to reduce the electric power consumption and to extend the life of a cell, so that it is possible to monitor for a longer time.

The term "MPEG", which has been described as a field of application of the present invention, will be briefly described. The term "MPEG (Moving Picture Experts Group)" means an organization for standardizing a color dynamic image storing coding system, and also means a coding system standardized by MPEG. The coding systems for MPEG include: MPEG1, which is applied to the transfer rate of about 1.5 Mbit/second and which is applied to storage media, such as a CD-ROM; MPEG2, applied to a transfer rate of few M to tens M bits/second and which is applied to an image transmission utilizing a generation television or a wide band ISDN; and MPEG4, is an image coding system for a low bit rate, such as transfer rate of few k bit/second.

MPEG4 is supposed to be mainly used for a mobile communication, and standardized so that small movements of a detailed image are not expected since the band for radio communication is small (about 0–28 kbps). Specifically, it is intended that an image having a size of QCIF (Quarter Common Intermediate Format) (176 pixels×144 pixels) or CIF (Common Intermediate Format) (352 pixels×288 pixels) is transmitted at a rate of about 10–15 frame/second. Although this target does not seem to be so difficult, it is difficult to realize this target unless a very effective compression method is used since the transfer band is very narrow. Therefore, a compression method quite different from MPEG2 may be adopted. In this case, the quantity of operation in a transmission system may be greatly increased. In addition, it is required to improve the efficiency of the compression method since it is used for a radio communication, as well as it is required to improve the error resistance of codes.

It is considered that a motion vector estimating system and a motion vector estimating method, according to the present invention, are applied to MPEG2 and MPEG4, and particularly to MPEG4 used for a radio communication for dynamic images.

What is claimed is:

1. A system for estimating a motion vector for a macro block, which designates an image in a predetermined range of a frame/field in an image data as a macro block to select proposed motion vectors in the macro block, calculates a signal-strength difference between picture elements corresponding to the proposed motion vectors of a current image and a reference image, accumulates the signal-strength differences calculated for the picture elements in the macro block to derive an accumulation result, and selects a proposed motion vector providing an accumulation result of a maximum or minimum value from the proposed motion vectors in a specific range of the macro block as a motion vector, said system comprising:

accumulating means comprising a plurality of accumulating circuits, connected as a pipeline, for inputting a current image data and a reference image data in parallel for the proposed motion vectors and for parallel-processing accumulation for a plurality of motion vectors;

accumulation stopping means for separately stopping an accumulation processing operation of the accumulating means for each of the accumulating circuits; and control means for controlling the supply of the current image data and the reference image data for the proposed motion vectors for each of the accumulating circuits of the accumulating means, and for outputting a separate stop signal for stopping a separate accumulation for each of the accumulating circuits to control the stop of the accumulation processing of the accumulation circuit.

2. The motion vector estimating system as set forth in claim 1, wherein each of said accumulating circuits of said accumulating means has a determining circuit having a predetermined identification threshold for comparing a partway accumulated value with the identification threshold at least once to determine whether an accumulated value is valid or invalid, on the basis of the comparison result, and wherein said stopping means has a separate stop circuit for stopping a corresponding accumulating circuit until the accumulation operation for a newly proposed motion vector is started, when the determination result of said determining circuit is invalid.

3. The motion vector estimating system as set forth in claim 2, wherein said accumulating means has a start circuit for disqualifying all of the proposed motion vectors currently reviewed to start the accumulation processing operation for a newly proposed motion vector, immediately after all of the accumulated values compared with the identification threshold in the parallel processing are determined to be invalid.

4. The motion vector estimating system as set forth in claim 3, wherein said stopping means has a stop circuit for outputting a motion vector estimation terminating signal when the motion vector estimation is completed, to stop the operation of said accumulating means until a motion vector estimation request signal is inputted from the outside.

5. The motion vector estimating system as set forth in claim 4, wherein said accumulating means determines said identification threshold on the basis of the maximum or minimum value of the accumulated values which have been reviewed.

6. The motion vector estimating system as set forth in claim 4, wherein said accumulating means determines said identification threshold using a fixed value, which does not change during a motion vector estimating process, on the basis of a predetermined rate to a theoretically available maximum value.

7. The motion vector estimating system as set forth in claim 6, wherein each of said accumulating circuits of said accumulating means has a flip-flop capable of retaining a maximum number which is equal to said identification threshold, and deals with a carry-out signal of the most significant digit of each of the accumulating circuits as a magnitude comparing signal compared with said identification threshold so as to decrease the number of digits of the flip-flop for retaining the accumulated values.

8. A method for estimating a motion vector for a macro block in a reference region, said method comprising the steps of:

designating an image in a predetermined range of a frame/field as a macro block, and selecting a plurality of proposed motion vectors existing in the reference region;

calculating, in parallel, signal-strength differences between corresponding picture elements of a current image and a reference image for a predetermined parallel number of proposed motion vectors of said plurality of proposed motion vectors in said macro block designated, and accumulating said signal-strength differences for each of specific proposed motion vectors processed in parallel; and stopping the accumulation for the proposed motion vectors when the accumulation result of the minimum or maximum value is identified for any one of the parallel number of proposed motion vectors processed in parallel.

9. The motion vector estimating method as set forth in claim 8, wherein said step of stopping the accumulation comprises the steps of:
- comparing the magnitudes of a partway accumulated value for each of said proposed motion vectors processed in parallel and a predetermined identification threshold at least once;
- determining whether the accumulated value for each of said proposed motion vectors is valid or invalid, on the basis of the compared result; and
- stopping the accumulation operation for the corresponding one of said proposed motion vectors until the accumulation for a newly proposed motion vector is started, when it is determined that the accumulated value is invalid.

10. The motion vector estimating method as set forth in claim 8, which, after said step of stopping accumulation, further comprises the step of: disqualifying all of said proposed motion vectors, for each of which the accumulation is carried out by the parallel processing, and starting a parallel processing for a newly proposed motion vector, immediately after all of the accumulation results for all of said proposed motion vectors processed in parallel are stopped.

* * * * *